United States Patent [19]

Moore

[11] 4,041,142

[45] Aug. 9, 1977

[54] METHOD FOR REMOVING SULFUR OXIDE FROM WASTE GASES AND RECOVERING ELEMENTAL SULFUR

[75] Inventor: Raymond H. Moore, Richland, Wash.

[73] Assignee: Battelle Memorial Institute, Richland, Wash.

[21] Appl. No.: 638,677

[22] Filed: Dec. 8, 1975

[51] Int. Cl.$^2$ .................. B01D 47/00; C01B 17/02
[52] U.S. Cl. .................. 423/573 G; 75/72; 423/210.5; 423/570; 423/576
[58] Field of Search .................. 423/210.5, 532, 533, 423/570, 573 G, 574 R, 576, 567, 535, 571, 539; 75/72, 74, 76

[56] References Cited

U.S. PATENT DOCUMENTS

| | | | |
|---|---|---|---|
| 1,162,150 | 11/1915 | Estelle | 75/23 |
| 1,730,514 | 10/1929 | Levy | 75/6 |
| 1,870,477 | 8/1932 | Bacon et al. | 75/6 |
| 1,917,235 | 7/1933 | Bacon et al. | 75/6 |
| 2,878,102 | 3/1959 | Sternfels | 75/72 |
| 3,284,158 | 11/1966 | Johswich | 423/532 |
| 3,306,708 | 2/1967 | Bryk et al. | 423/567 |
| 3,351,462 | 11/1967 | Argentzen et al. | 75/72 |
| 3,692,480 | 9/1972 | Snoek et al. | 423/574 R |
| 3,764,665 | 10/1973 | Groenendaal et al. | 423/574 |
| 3,789,110 | 1/1974 | Ball | 423/539 |
| 3,855,386 | 12/1974 | Moore | 423/210.5 |
| 3,933,992 | 1/1976 | Andral et al. | 423/573 |
| 3,945,904 | 3/1976 | Robison | 423/574 R |

*Primary Examiner*—Walter R. Satterfield
*Attorney, Agent, or Firm*—Klarquist, Sparkman, Campbell, Leigh, Hall and Whinston

[57] ABSTRACT

A continuous catalytic fused salt extraction process is described for removing sulfur oxides from gaseous streams. The gaseous stream is contacted with a molten potassium sulfate salt mixture having a dissolved catalyst to oxidize sulfur dioxide to sulfur trioxide and molten potassium normal sulfate to solvate the sulfur trioxide to remove the sulfur trioxide from the gaseous stream. A portion of the sulfur trioxide loaded salt mixture is then dissociated to produce sulfur trioxide gas and thereby regenerate potassium normal sulfate. The evolved sulfur trioxide is reacted with hydrogen sulfide as in a Claus reactor to produce elemental sulfur. The process may be advantageously used to clean waste stack gas from industrial plants, such as copper smelters, where a supply of hydrogen sulfide is readily available.

11 Claims, 1 Drawing Figure

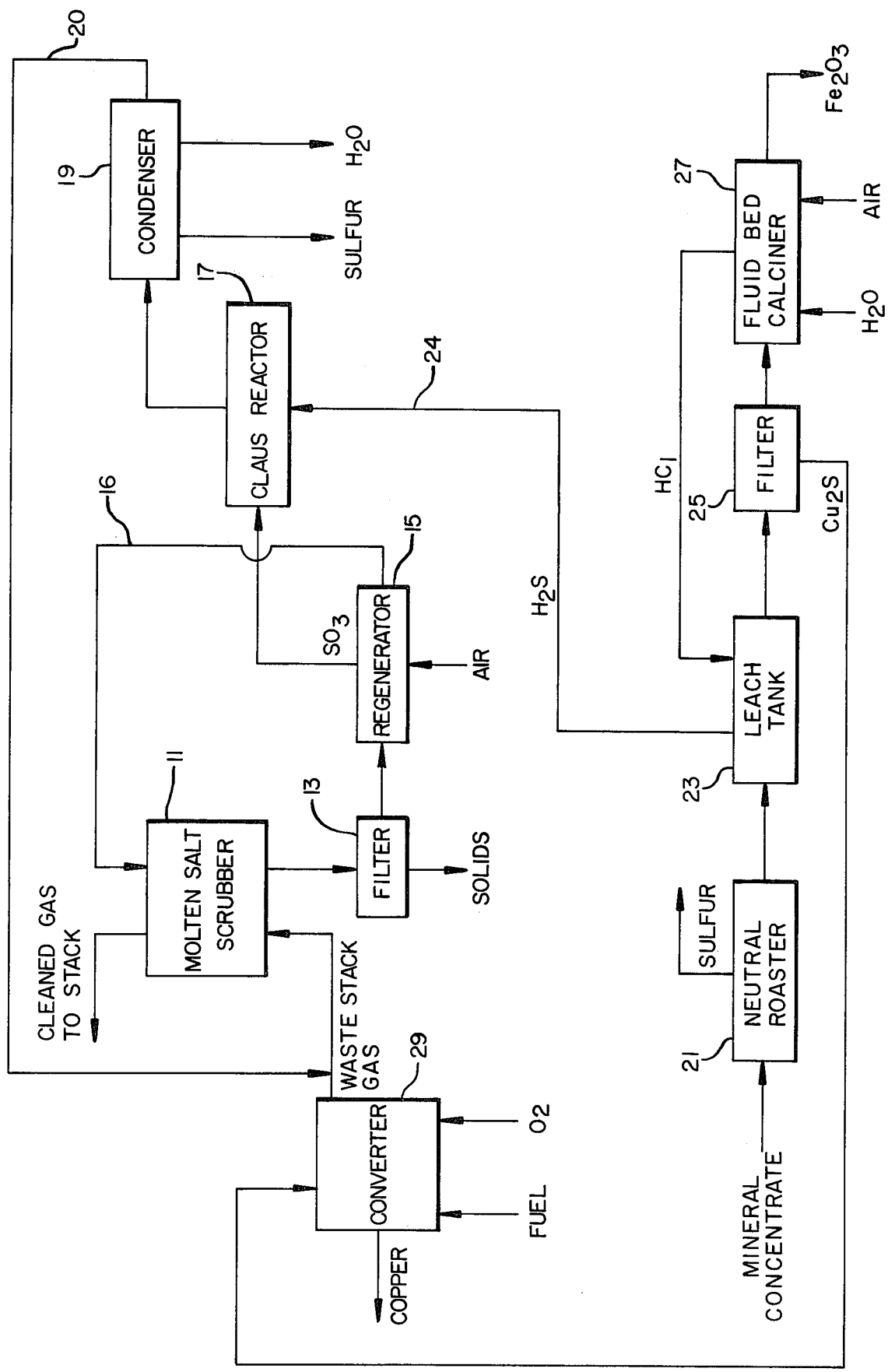

METHOD FOR REMOVING SULFUR OXIDE FROM WASTE GASES AND RECOVERING ELEMENTAL SULFUR

BACKGROUND OF THE INVENTION

This invention relates to a process for removing sulfur oxides from a waste gas stream and recovering elemental sulfur. More specifically, this invention relates to a catalytic fused salt extraction process for removing sulfur compounds, particularly sulfur dioxide and sulfur trioxide, from waste stack gases, regenerating sulfur trioxide gas from the molten salt and reacting the sulfur trioxide with hydrogen sulfide in a Claus reaction to produce elemental sulfur.

Significant quantities of sulfur oxides and especially sulfur dioxide area present in the waste stack gases of many industrial installations including metal refineries, chemical plants, pulp mills, oil refineries and fossil fuel burning power generating plants. Despite extensive research efforts to reduce environmentally hazardous sulfur oxide discharges, few practical methods for the cleansing of waste stack gases have been proposed.

Methods of gas purification which are the most attractive are those which can be implemented at a relatively low capital cost and which are able not only to cleanse waste stack gases of sulfur oxides but also to transform recover sulfur oxides into valuable byproducts at reasonably low operating costs. The preferred byproduct is elemental sulfur which can be most easily store, transported or converted to a variety of useful compounds.

U.S. Pat. No. 3,789,110 to Ball illustrates a process in which sulfur dioxide from waste stack gas in absorbed onto activated carbon as sulfuric acid. The sulfuric acid laden activated carbon is subsequently reacted with a correct proportion of hydrogen sulfide to reduce all the hydrogen sulfide and a portion of the absorbed sulfuric acid to elemental sulfur. Elemental sulfur and the remaining sulfuric acid are then reacted to form concentrated sulfur dioxide without reaction with the activated carbon. The sulfur dioxide is recovered and the completely regenerated activated carbon recycled to react with additional waste stack gases. The recovered sulfur dioxide gas may be further reacted to form byproducts such as hydrogen sulfide, elemental sulfur to sulfuric acid. This and a wide variety of similar systems proposed for cleansing gases of sulfur oxides and converting the recovered suflur oxides into useful products require a multiplicity of steps which are both cumbersome and costly. In addition, many of the proposed systems employ steps which are not sufficiently efficient at removing sulfur oxides from the waste stack gases to meet current pollution standards without a secondary treatment of the gas streams.

In recent years it has been determined that sulfur oxides may be removed from gas streams with high efficiency by contacting the gas stream with molten salt mixtures under certain conditions. U.S. Pat. No. 3,553,921 to Clytas describes a catalytic fused salt extraction process utilizing essentially a molten salt of potassium sulfate and potassium pyrosulfate to remove sulfur dioxide from waste stack gases. The extraction process forms a pyrosulfate-rich salt solution. To regenerate the molten salt, the pyrosulfate-rich solution is heated to a temperature above 600° C. to reverse the process and form potassium sulfate and sulfur trioxide.

My U.S. Pat. No. 3,855,386 described an improved system of sulfur dioxide removal from gaseous streams which operates at lower temperatures and less corrosive conditions. This system involves contacting the gaseous stream with a molten potassium sulfate salt mixture having dissolved $V_2O_5$ and recovering sulfur trioxide from the salt mixture.

The use of a Claus reactor to convert sulfur oxides in waste stack gases into elemental sulfur is mentioned in the EPA Technical Report No. EPA-650/2-74-085-b. This report also describes the acid leaching of neutral roasted copper concentrates for the production of hydrogen sulfide and underscores the necessity of developing a method of scrubbing sulfur oxides from waste stack gases which is of greater efficiency than the unaided Claus reaction.

SUMMARY OF THE INVENTION

It has now been found that sufficient quantities of sulfur oxides may be removed from waste stack gases to meet air quality standards by the single step of contacting the waste gas stream with a molten liquid potassium sulfate salt mixture which contains a catalyst to promote the oxidation of sulfur dioxide to sulfur trioxide, and that the $SO_3$ may be separated from the molten salt mixture as a high purity off gas and reacted with hydrogen sulfide gas to produce elemental sulfur. In this process substantially no sulfur containing gases, other than small residual amounts in the scrubbed waste stack gases, are discharged to the atmosphere.

An object of this invention is to provide a process for cleansing waste stack gases of sulfur oxides which combines high efficiency waste gas cleansing and economical conversion of sulfur oxides into elemental sulfur.

Another object of this invention is to provide such a system which may be installed at a relatively small capital expenditure and which may be operated and maintained at a minimum cost.

An additional object of this invention is to provide a sulfur oxide removal process which is especially wellsuited for control of sulfur dioxide emissions from metal refineries, such as copper smelters, where large quantities of hydrogen sulfide gas are readily available.

BRIEF DESCRIPTION OF DRAWING

The attached drawing is a flow diagram which shows the process of the present invention specifically applied to a copper smelter.

DESCRIPTION OF THE PREFERRED EMBODIMENT

A waste gas stream containing sulfur oxides, typically 0.01 to 4% and even as high as 20% sulfur oxides, is contacted with a molten liquid homogeneous catalytic extraction salt mixture. The waste stack gas is cleansed of sulfur oxides which are first converted to $SO_3$ then dissolved in the molten salt mixture. $SO_3$ gas is later separated from the salt mixture and converted to elemental sulfur. Methods quite suitable for the catalytic fused salt extraction of sulfur oxide from flue or other gases are well known, for example, a very satisfactory method is disclosed and claimed in my U.S. Pat. No. 3,855,386. In the process of this patent, the gas stream containing sulfur oxides is contacted with a molten homogeneous catalytic extraction salt mixture at a temperature below 500° C. in which the molten liquid salt mixture comprises a dissolved oxygen compound of vanadium to catalytically oxidize sulfur dioxide to sulfur trioxide and an extractant of molten potassium normal sulfate ($K_2SO_4$) to react with the sulfur trioxide to form molten potassium pyrosulfate thereby solvating the sulfur trioxide and forming a sulfur dioxide depleted gaseous stream and a sulfur trioxide loaded molten liquid salt mixture.

Referring to the drawing, waste stack gases are directed to a salt scrubber 11 which consists of a contacter means wherein sulfur dioxide is rapidly oxidized to sulfur trioxide as the waste stack gas flows countercurrently through a stream of the molten liquid homogeneous catalytic extraction salt mixture at temperatures between 400° and 500° C., preferably 400° to 440° C., the optimum temperature being approximately 425° C.

As mentioned above, the molten liquid homogeneous catalytic extraction salt mixture preferably contains catalytically active, oxygenated compounds of vanadium to catalytically oxidize sulfur dioxide to sulfur trioxide. Preferably, the oxygen compound of vanadium is vanadium pentoxide ($V_2O_5$), and is included in operable amounts of up to 20 mole percent of the total mixture. Preferably the vanadium pentoxide concentration should be between 5 and 15 mole percent. The catalytic reaction may be written as follows:

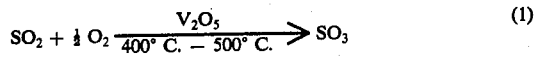   (1)

The preferred molten liquid homogeneous catalytic extraction salt mixture contains an active extractant of liquid potassium normal sulfate ($_2SO_4$) to solvate the sulfur trioxide in the molten liquid salt solution by forming liquid potassium pyrosulfate ($K_2S_2O_7$) to thus remove the sulfur trioxide from the gaseous stream. The solvation reaction may be written as follows:

   (2)

A wide range of potassium sulfate mixture compositions may be used. A suitable composition range, in mole percent, consists of 60–80 potassium pyrosulfate, 5–20 potassium normal sulfate and 5–20 vanadium pentoxide. In addition certain non-reactive molten sulfate salts may optionally be included with the potassium sulfates to serve as inert dilutants.

It has been found that by maintaining the temperatures of the molten liquid mixture in contact with the gaseous stream between 400° C. and 500° C., over 75% of the sulfur oxide ($SO_2$ and $SO_3$) can be removed from the gaseous stream. It has further been found that removal efficiencies of greater than 98% can be obtained by maintaining contact temperature of the molten liquid mixture between 425° C. and 440° C. The molten solution is capable of being loaded with the sulfur oxides in stoichiometric relation to the content of the potassium normal sulfate therein according to formula (2). The sulfur dioxide depleted waste stack gas which energes from the salt scrubber 11 is vented to the atmosphere.

The molten liquid salt mixture, not only removes the sulfur oxides from the waste stack gas, but it also serves as a scrubbing agent to remove much of the fly ash from the waste stack gas in the salt scrubber 11. Fly ash and other solids entrained in the molten salt can be removed by a continuous filter 13 to prevent particle build-up in a continuous circulating system. In such a continuously circulating system, it is convenient to perform the filtration at the same temperature as the salt extraction, i.e., in the range of 400° C - 440° C.,most preferably 425° C.

In order to maintain a high efficiency sulfur oxide removal from the waste gas stream, it is necessary to separate the catalytic molten potassium sulfate salt mixture from the gaseous stream before the molten liquid salt mixture becomes saturated with sulfur trioxide. Stated another way, it is neccessary to remove the catalytic molten potassium sulfate salt mixture from the gaseous stream before the potassium normal sulfate in the mixture is depleted and entirely converted to potassium pyrosulfate. Preferably, the molten salt mixture should be separated from the gaseous stream before the potassium normal sulfate falls below 5 mole percent of the total mixture. This is most conveniently accomplished by passing the filtered molten salt mixture through a regenerator 15 where at least a portion of the potassium pyrosulfate is dissociated to produce gaseous sulfur trioxide and to regenerate potassium normal sulfate. The salt mixture containing regenerated potassium normal sulfate is recycled to the salt scrubber 11 via a return line 16. The gaseous sulfur trioxide is passed from the regenerator 15 to a Claus unit 17.

The regenerator 15 may be of any type suitable for separating gaseous sulfur trioxide from the saturated molten salt mixture. An example of a suitable regenerator is shown in my U.S. Pat. No. 3,855,386. The regenerator referred to is a diaphragm type electrolytic cell wherein the sulfur trioxide loaded molten solution is subjected to an electrical potential to reduce at least a portion of the potassium pyrosulfate to sulfur trioxide and potassium normal sulfate and to evolve the sulfur trioxide solute as a gaseous effluent and to regenerate the extractant potassium normal sulfate. The sulfate regeneration formulae are as follows:

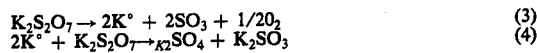   (3)
  (4)

The anode reactions are:

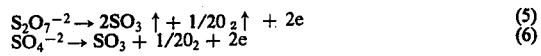   (5)
  (6)

The cathode reaction is:
   (7)

An oxygen-bearing gas, such as air, is added to the regenerated molten salt mixture in the regenerator 15 to oxidize any oxygen-deficient vanadium or potassium compounds prior to recycling in the line 16.

In the Claus unit 17 the liberated sulfur trioxide gas is combined with hydrogen sulfide and reacted to yield elemental sulfur. Temperatures in the Claus unit may range between 650° C. - 900° C., preferably 825° C. This reaction is catalyzed by alumina ($Al_2O_3$) and proceeds according to a modified Claus reaction formula as follows:

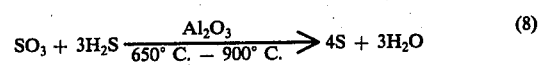   (8)

Gaseous elemental sulfur, water vapor and any excess hydrogen sulfide is passed from the Claus unit 17 to a condenser 19 where the gases are cooled causing the elemental sulfur to be condensed and removed from the process. The water vapor is then condensed and the resulting water removed from the process. Any gases including any excess $H_2S$ which remain are returned to the process by a return line 20 and are recycled by admixture with the waste stack gases moving through a line 30 to the inlet of the salt scrubber 11. In the salt scrubber 11, any recycled $H_2S$ is oxidized to $SO_3$ and $H_2O$ according to the general formula:

$$H_2S + 2O_2 \xrightarrow[400° C. - 500° C.]{V_2O_5} SO_3 + H_2O \tag{9}$$

and this $SO_3$ also converted to elemental sulfur and water as described above. The entire process above described may be operated at substantially atmospheric pressure.

The sulfur recovery system described above is especially well suited for recovering elemental sulfur from the sulfur oxide emissions of copper smelters and other metal refining plants where quantities of hydrogen sulfide are available as a byproduct of the refining process. The major operating units of a conventional copper smelter are also shown in the figure. The smelter includes a neutral roaster 21 in which a sulfide copper concentrate is roasted. Sulfide copper is most commonly associated with iron pyrite ($FeS_2$) and the concentrates contain both copper sulfide an iron sulfide. Roasting in the neutral roaster 21 is performed in an inert atmosphere at temperatures above 775° C. and preferably at 800° C. Under these conditions copper-iron sulfide concentrates are converted by an extremely complex and imperfectly defined mechanism, into FeS, $Cu_2S$ and elemental sulfur. Thus, the roasting process converts pyrites ($FeS_2$) to pyrrhotite (FeS). Under these conditions elemental sulfur is expelled from the neutral roaster 21 as a gas. FeS and $Cu_2S$ solids are passed on to a leach tank 23.

Unlike pyrites, pyrrhotites can be leached from the concentrate with 4–5N HCl. The reaction of HCl with FeS is according to the following formula:

$$FeS + 2HCl \xrightarrow{heat} FeCl_2 + H_2S \tag{10}$$

Leaching is performed at elevated temperatures of up to 106° C., preferably at 80° C – 90° C. with a solids residence time in the leach tank 23 of about 3 hours. The gaseous product of this leaching operation is mainly composed of hydrogen sulfide with some residual HCl vapor which can be separated from the hydrogen sulfide by passing the gas stream through an acid scrubber (not shown) containing cooled HCl liquid or other suitable scrubber means. The remaining $H_2S$ off gas from the leach tank 23 is piped via a line 24 to the Claus unit 17.

In order to maximize the recovery of elemental sulfur from the $SO_3$ liberated in the regenerator 15, it is necessary to produce sufficient $H_2S$ to react with all the $SO_3$ regenerated. Unless an independent source of $H_2S$ is used, this means that about three-fourths of the sulfur in the neutral roasted copper ore concentrate must be converted to $H_2S$ in the acid leaching operation. In actual practice more than three-fourths conversion must be obtained. There are two reasons for this: (1) some $H_2S$ is needed to precipitate the dissolved copper and trace impurities in the leach solution; and (2) some $SO_2$ is formed in the neutral roasting operation. It may be required that $SO_2$ from this source also be converted to elemental sulfur. In a typical commercial operation it would probably be necessary to convert about 80% of the sulfur in neutral-roasted concentrate to $H_2S$ in order to convert all of the $SO_2$ produced in the plant toelemental sulfur. For concentrates which are deficient in iron sulfide, additional amounts of iron sulfide (pyrite) would have to be provided to generate a sufficient amount of $H_2S$ in the leaching step. This is not a particularly critical problem because most sulfide copper ore bodies contain excess pyrite which is rejected during the concentration of copper ore. Excess pyrite may be separately roasted and then added to the roasted copper sulfide concentrate entering the leach tank 23 or it may be allowed to accumulate with the copper sulfide concentrate prior to roasting.

The neutral roasted concentrate is leached in hydrochloric acid (4–5N) to dissolve the iron and convert an equal molar amount of sulfur to hydrogen sulfide. Throughout this step the copper sulfides are relatively insoluble and remain as a solid residue after the pyrrhotite is dissolved.

The contents of the leach tank 23 are next passed to a filter 25. The slurry from the leach tank 23 is filtered and the solid residue containing $Cu_2S$ is washed with the water. The leach solution from the filter 25 consists of hydrochloric acid and iron chloride, principally as ferric chloride. The iron chloride in this solution is converted to ferric oxide in a fluid bed calciner 27 or other equivalent means. Azeotropic hydrochloric acid is recovered and along with any necessary make up hydrochloric acid may be returned to the leach tank 23 for reuse. The hydrous ferric oxide which precipitates in the fluid bed calciner 27 amy readily be converted to hematite for recovery of iron.

The solids separated in the filter 25 contain the bulk of the copper as copper sulfide ($Cu_2S$) and a small amount of pyrite. These solids are sent to a converter 29 where copper sulfide reacts with oxygen at elevated temperatures to produce elemental copper at a purity of about 99%, sulfur dioxide and to a lesser extent sulfur trioxide. The copper conversion formulae are generally as follows:

$$Cu_2S + O_2 \xrightarrow{heat} 2Cu + SO_2 \tag{11}$$
$$2Cu_2S + 3O_2 \xrightarrow{heat} 4Cu + 2SO_3 \tag{12}$$

Oxygen or a combination of oxygen and an oxygen bearing gas such as air are supplied to the converter 29 to react with the sulfur in the copper sulfide. Because of the low sulfur content of the converter feed, much of heat required for converter operations must be supplied by the combustion of natural gas or other fuel.

The waste stack gas emerging from the converter 29, containing significant amounts of sulfur oxides, especially sulfur dioxides, is passed via the line 30 to the salt scrubber 11. Sulfur oxides are scrubbed from the waste stack gas and converted into elemental sulfur according to the process previously described.

When the sulfur oxide recovery system of the present invention is incorporated into a copper smelter, hydrogen sulfide gas from the leaching operation performed in the leach tank 23 is supplied for use in the Claus unit 17 via the line 24. Excess hydrogen sulfide gas from the condenser 19 is passed through the return line 20 and combines with converter waste stack gases in the line 30.

In a copper smelter where 1440 tons of concentrate with the composition Cu-20.77 weight percent, Fe-30.74 weight percent, S-40.82 weight percent, isolubles — 6.62 weight percent, trace elements — 0.99 weight percent, are processed per day, it is calulated 300 tons/day of Cu and 636 tons/day of $Fe_2O_3$ may be obtained. Where air is the primary oxygen bearing gas supplied to the converter, approximately 0.37 billions of/day of converter waste stack gas, containing about 5,000 ppm of sulfur doixide is produced. When submitted to catalytic fused salt extraction, this gas produces about 188 tons/day of sulfur trioxide. This sulfur trioxide gas reacts with 239 tons/day of hydrogen sulfide in the Claus unit, producing 300 tons of elemental sulfur per day. When combined with the 260 tons of elemental sulfur per day produced in the neutral roaster, total daily sulfur production for the system is 560 tons.

While I have shown and described a preferred embodiment of the invention, it will be apparent to those skilled in the are that many changes and modifications may be made without departing from the invention in its broader aspects.

I claim:

1. A process for removing sulfur dioxide from a gaseous stream containing said sulfur dioxide, which comprises:

in a scrubber contacting said stream with a sulfur dioxide depleted molten fused salt mixture, containing a dissolved oxidizing catalyst and maintained at a temperature not greater than 500° C., to (1) oxidize said sulfur dioxide to sulfur trioxide, (2) dissolve said sulfur trioxide and (3) form a sulfur dioxide depleted gaseous stream and a sulfur trioxide loaded molten liquid salt mixture separating said sulfur trioxide loaded molten liquid salt mixture and the sulfur dioxide depleted gaseous stream before the molten salt mixture becomes saturated with sulfur trioxide, dissociating the separated sulfur trioxide loaded molten liquid salt mixture to produce a gaseous effluent of sulfur trioxide and to regenerate said sulfur dioxide depleted molten fused salt mixture, combining said sulfur trioxide with hydrogen sulfide to form a gaseous mixture having a $SO_3:H_2S$ molar ratio not substantially greater than 1:3, and maintaining said mixture in a Claus reactor at an elevated temperature sufficient to cause said hydrogen sulide to reduce said sulfur trioxide to produce elemental sulfur and water.

2. The process of claim 1 wherein the catalyst is a dissolved oxygen compound of vanadium.

3. The process of claim 1 wherein said fused salt mixture is maintained at a temperature between 400° C and 500° C. and said mixture contains a dissolved potassium normal sulfate to dissolve the sulfur trioxide so as to extract the sulfur trioxide from said gaseous stream.

4. The process of claim 1 wherein the dissociating of said separated sulfur trioxide loaded molten liquid salt mixture is accomplished by electrolysis.

5. The process of claim 1 further comprising continuously recycling the regenerated sulfur dioxide depleted molten salt mixture into contact with the gaseous stream containing said sulfur dioxide.

6. The process of claim 3 wherein said catalytic fused temperature between 400°–440° C.

7. The process of claim 1 wherein said mixture of sulfur trioxide and hydrogen sulfide is maintained in said Claus reactor at a temperature between 650° C. and 900° C.

8. The process of claim 1 wherein the reducing of said sulfur trioxide with said hydrogen sulfide to form elemental sulfur and water is catalyzed by alumina ($Al_2O_3$).

9. The process of claim 1 wherein aid molar ratio of $SO_2:H_2S$ is less than 1:3.

10. The process of claim 1 further comprising:
recovering excess hydrogen sulfide from said Claus reactor; and
feeding the recovered hydrogen sulfide into said scrubber with said gaseous stream containing said sulfur dioxide.

11. A process for removing sulfur dioxide from a stream of waste stack gas produced during a copper smelting process comprising;

continuously feeding said stream of waste stack gas to a scrubber;

in said scrubber, contacting said stream with a molten fused salt mixture at a temperature between 400° C. and 500° C.;

said mixture containing a dissolved oxygen compound of vanadium to catalytically oxidize said sulfur dioxide to sulfur trioxide and a dissolved potassium normal sulfate to dissolve said sulfur trioxide and thereby form a sulfur dioxide depleted gaseous stream and a sulfur trioxide loaded molten liquid salt mixture;

separating the sulfur trioxide loaded molten liquid salt mixture and the sulfur dioxide depleted gaseous stream before the molten salt mixture becomes saturated with sulfur trioxide;

electrolytically dissociating the separated sulfur trioxide loaded molten liquid salt mixture to produce a gaseous effluent of sulfur trioxide and to regenerate at least a portion of the potassium normal sulfate;

continuously recycling the regenerated molten salt solution into contact with said stream of waste stack gas;

combining said sulfur trioxide with hydrogen sulfide to form a gaseous mixture having a $SO_3:H_2S$ molar ratio of less than 1:3;

maintaining said mixture in a Claus reactor in the presence of a catalyst at a temperature between 775° C. to cause said $H_2S$ to reduce said $SO_3$ to produce elemental sulfur and water;

recovering excess hydrogen sulfide from said Claus reactor;

feeding the recovered hydrogen sulfide into said scrubber with said stream of waste stack gas.

* * * * *

UNITED STATES PATENT AND TRADEMARK OFFICE
CERTIFICATE OF CORRECTION

PATENT NO. : 4,041,142
DATED : August 9, 1977
INVENTOR(S) : Raymond H. Moore

Page 1 of 2

It is certified that error appears in the above-identified patent and that said Letters Patent are hereby corrected as shown below:

Col. 1, line 17, "area" should be --are--; Col. 1, line 28, "recover" should be --recovered--; Col. 1, line 32, "store" should be --stored--; Col. 1, line 47, "to" should be --or--; Col. 1, line 61, "3,553,921" should be --3,552,921--; Col. 1, line 61, "Clytas" should be --Blytas--; Col. 3, line 31, "$(_2SO_4)$" should be --$(K_2SO_4)$--; Col. 3, line 57, "energes" should be --emerges--; Col. 4, line 35, "$1/2O_2$" should be --$1/2\ O_2$--; Col. 4, line 36, "$k2SO_4$" should be --$K_2SO_4$--; Col. 4, line 40, "$1/2O_2$" should be --$1/2\ O_2$--; Col. 4, line 40, "2e" should be --2e- --; Col. 4, line 41, "$1/2O_2$" should be --$1/2\ O_2$--; Col. 4, line 41, "2e" should be --2e- --; Col. 4, line 43, "2e" should be --2e- --; Col. 5, line 22, "an" should be --and--; Col. 5, line 65, "toelemental" should be --to elemental--; Col. 6, line 27, "amy" should be --may--; Col. 6, line 64, after "calculated" insert --that--; Col. 6, line 67, "of/day" should be --cf/day--; Col. 7, line 40, "sulide" should be --sulfide--; Col. 8, line 2, "fused temperature" should be --fused salt mixture is at a temperature--; Col. 8, line 10, "aid" should be

UNITED STATES PATENT AND TRADEMARK OFFICE
CERTIFICATE OF CORRECTION

PATENT NO. : 4,041,142
DATED : August 9, 1977
INVENTOR(S) : Raymond H. Moore

Page 2 of 2

It is certified that error appears in the above-identified patent and that said Letters Patent are hereby corrected as shown below:

--said--; Col. 8, line 11, "$SO_2:H_2S$" should be --$SO_3:H_2S$--; Col. 8, line 49, "775°C. to cause" should be --775°C. and 825°C. to cause--; cited references, Patent No. 3,351,462, "Argentzen" should be --Arentzen--.

Signed and Sealed this

Tenth Day of January 1978

[SEAL]

Attest:

RUTH C. MASON
Attesting Officer

LUTRELLE F. PARKER
Acting Commissioner of Patents and Trademarks